Feb. 17, 1959     J. DICKSON     2,873,575
INTAKE AND EXHAUST MANIFOLD SYSTEM
Filed Aug. 18, 1954     6 Sheets-Sheet 1

INVENTOR
John Dickson
BY
J. C. Thorpe
ATTORNEY

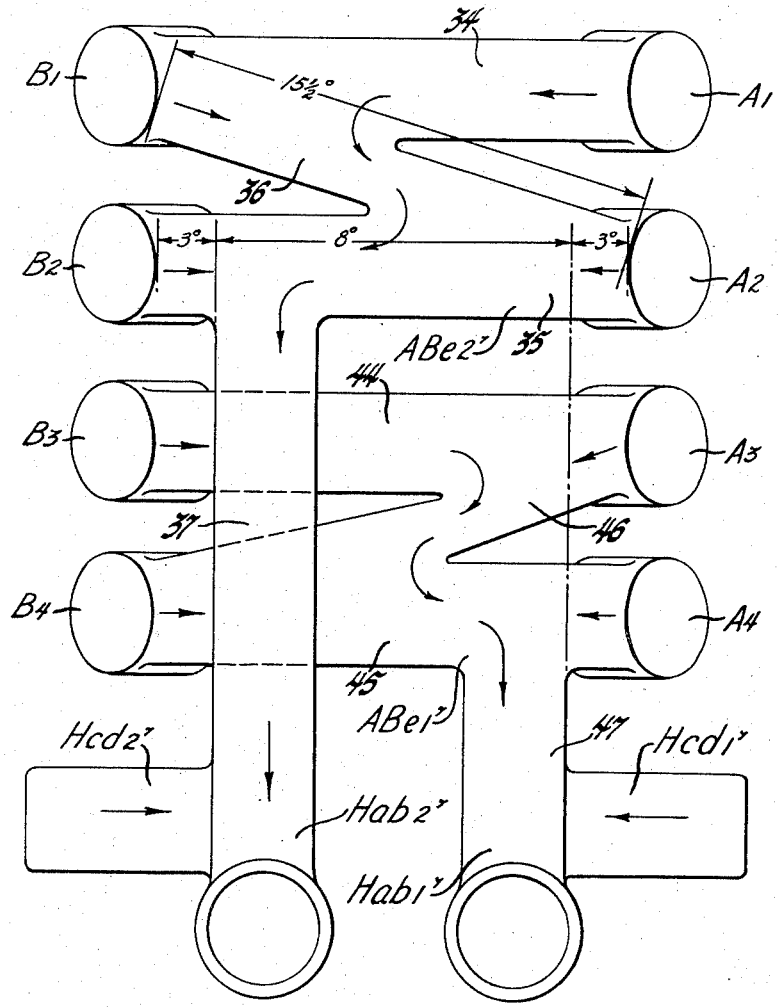

United States Patent Office 2,873,575
Patented Feb. 17, 1959

2,873,575

INTAKE AND EXHAUST MANIFOLD SYSTEM

John Dickson, Huntington Woods, Mich., assignor to General Motors Corporation, Detroit, Mich., a corporation of Delaware Application August 18, 1954, Serial No. 450,645

3 Claims. (Cl. 60—29)

This invention relates to the manifolding for an internal combustion engine and particularly to the exhaust manifold system of a multi-row radial engine.

In the exhaust manifolding of internal combustion engines, exhaust impulse pressure waves are generated by discharge of combustion gases into the exhaust manifolds and travel at the speed of sound in the exhaust gases or approximately 1400 feet per second. These pressure waves are harmonic functions dependent on the rotational speed of the engine crankshaft translated as the initial impulses of the combustion gases sequentially exhausting from the various cylinders. However, as a practical matter, only the first harmonics of such pressure waves are generally of sufficient strength to seriously impair the breathing characteristics of such an engine. Hence, only the first harmonic pressure waves need to be considered in the design of an exhaust manifold system for an engine, and in the ensuing discussion and in the claims that follow, the term "exhaust impulse reactions" refers to only the reactions of the first harmonic pressure waves.

The exhaust manifolds for such multi-row radial engines are generally of the runner type with parallel manifolds being located between adjacent cylinder banks. Such manifolds are simple to design and construct and permit a high degree of accessibility to the crankcase and various other engine components. However, such manifolds are not arranged to provide optimum intake and exhaust discharge conditions for the engine. With such runner-type manifolds, the reactions from multiple exhaust impulse pressure waves occurring in the exhaust manifolds from the exhausting of the various cylinders connected thereto are unevenly applied to the exhaust openings of each engine cylinder as to number of reactions, the strength thereof, and the timing thereof with reference to the operating cycle of each engine cylinder. This results in uneven exhausting or scavenging of the various engine cylinders with resultant uneven loading of the various engine cylinders, congestion and uneven gas flow to the exhaust manifolding, and rough engine operation generally.

Among the principal objects of the present invention is to provide an exhaust manifolding for such an engine so arranged as to overcome the aforementioned objections, into which the cylinders will discharge their exhaust gases at substantially equal intervals of engine rotation so that each cylinder connected thereto will be subjected to a single exhaust impulse reaction during approximately the same phase of the combustion gas exhausting portion of its operating cycle as the reactions occurring at the other cylinders during the gas exhausting portions of their respective operating cycles, and which will prevent congestion in the manifold and produce a more uniform gas flow therein.

The invention has particular application to multi-row radial two-cycle engines having an even number of cylinder banks with crankshaft throws and firing order so arranged as to give even firing of all the cylinders throughout 360° of crankshaft rotation. However, its use is not limited to engines of this particular type and is considered applicable to multi-row radial engines generally. The invention in its broader aspects provides such engines with a plurality of exhaust manifolds which interconnect the cylinders on adjacent inline rows of cylinders in groups so that the exhaust port opening or passage of each cylinder connected thereto will be subjected to a single exhaust impulse reaction occurring at approximately the same phase of the combustion gas exhausting portion of its operating cycle as the reaction occurring at the exhaust port openings or passages of the other cylinders during the combustion gas exhausting portions of their respective operating cycles.

The aforementioned and other objects, features, and advantages of this invention will be more thoroughly understood from the following description of a representative radial engine embodying the invention in which reference is made to the attached drawings in which:

Figure 7 is a diagrammatic view showing a second form of exhaust manifolding constructed in accordance with the invention.

By way of illustration, a manifold system constructed in accordance with my invention is shown and described as embodied in a commercially available 16-cylinder X-type internal combustion engine having four inline rows of four cylinders each arranged radially on a four-throw crankshaft at 90° intervals. For the purpose of the following description, the four groups of inline cylinders are designated A, B, C, and D; the banks thereof are designated 1, 2, 3, and 4; and the individual cylinders of inline group A will be designated A1, A2, A3, and A4, and the cylinders in the B, C, and D groups will be similarly designated.

Figure 1A:
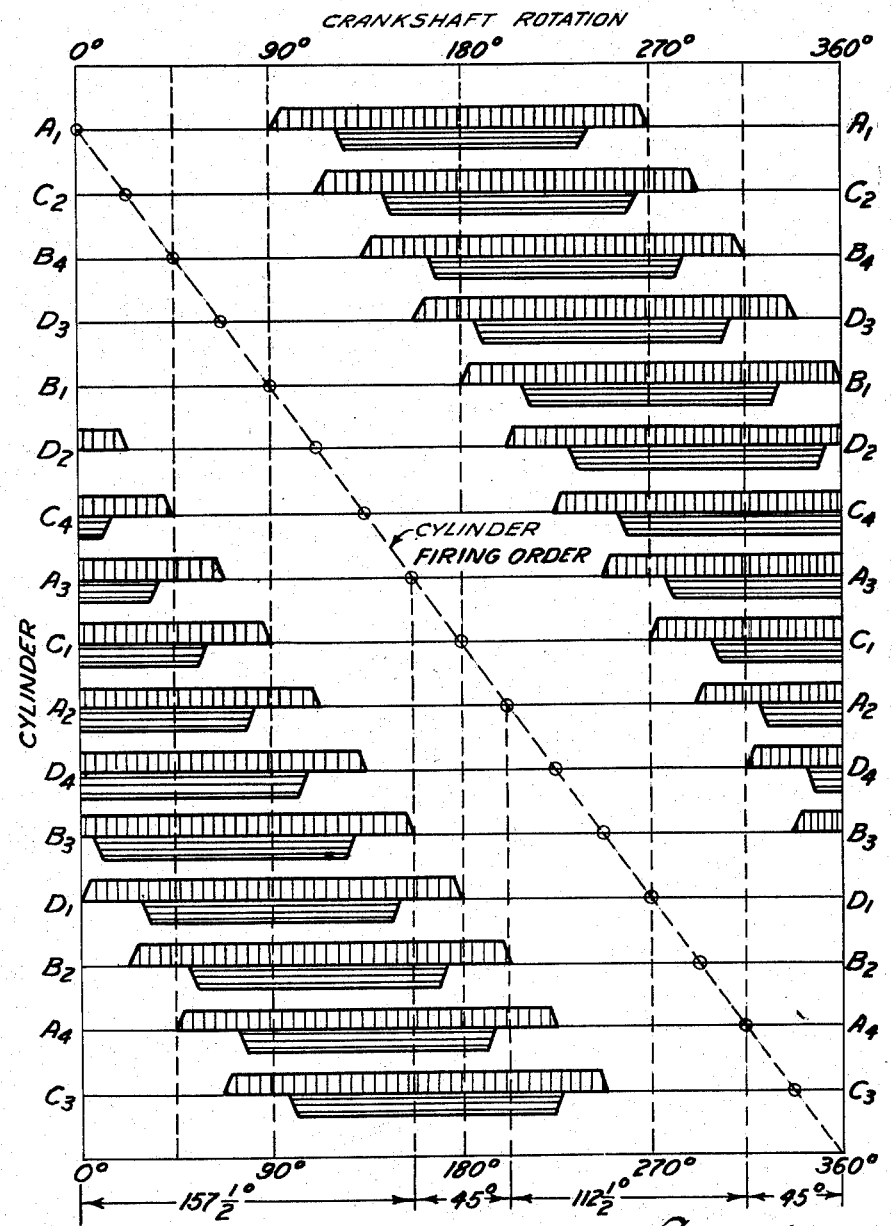
Figure 1a is a diagram showing the approximate phase relationship occurring between the operating cycles of the various engine cylinders.
Figure 1:
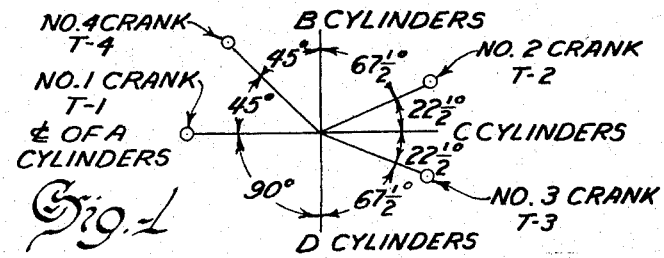
Figure 1 is a diagrammatic view of the crankshaft arrangement for the engine.

Referring to the drawings, Figure 1 shows conventional four-throw crankshaft arrangement for such an engine. The crankshaft throws correspond to the cylinder banks adjacent thereto and are similarly numbered T1, T2, T3 and T4. In Figure 1, the crankshaft throw T1 is shown coincident with the center line of the A cylinders at 0° of crankshaft rotation; the crankshaft throw T2 is disposed at an angle of 157½° in a clockwise direction from T1; crankshaft throw T3 is disposed at a clockwise angle of 45° to T2; and throw T4 is disposed at a clockwise angle of 212½° to T3. With clockwise rotation of the crankshaft, as indicated, this crank throw arrangement provides even firing of the 16 cylinders throughout each 360° of crankshaft rotation at 22½° intervals as follows: A1, C2, B4, D3, B1, D2, C4, A3, C1, A2, D4, B3, D1, B2, A4, and C3. This firing order is best shown by the diagram in Figure 1a. While this diagram shows the firing of each cylinder to be at top dead center, it is appreciated that for maximum power and smooth operation, the initial firing in each cylinder preferably occurs slightly ahead of this position. It is further shown by the diagram in Figure 1a that the opening and closing of the exhaust ports in such a two-cycle loop-scavenged engine is approximately 90° before and after bottom dead center as indicated by the vertically cross-hatched bar for each cylinder and the opening and closing of the intake scavenging air ports is approximately 60° before and after bottom dead center, respectively, as indicated by the horizontally cross-hatched bar for each cylinder.

Figure 2:
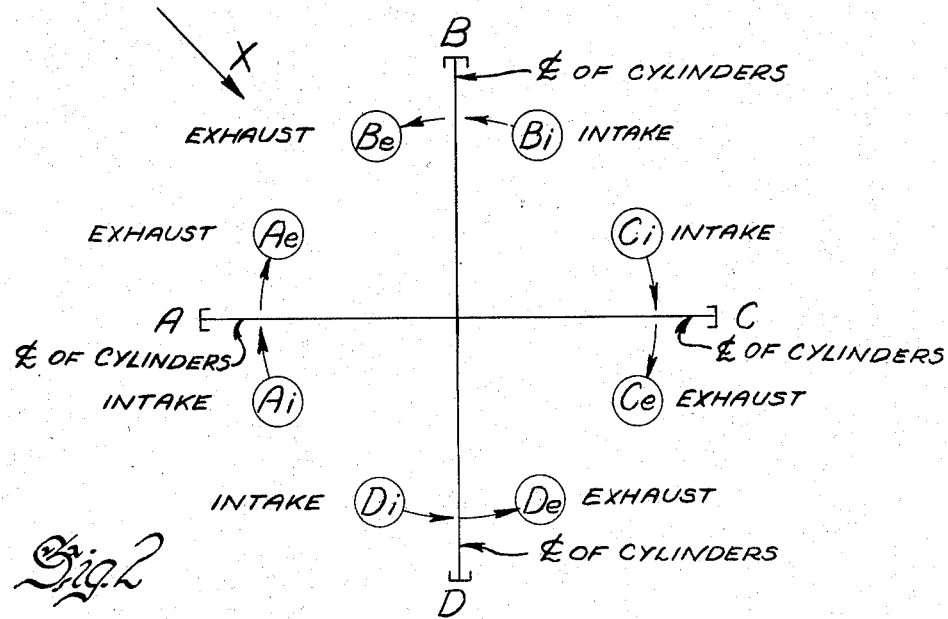
Figures 2 and 3 are diagrammatic views showing conventional exhaust and intake manifolds for such an engine.
Figure 3:
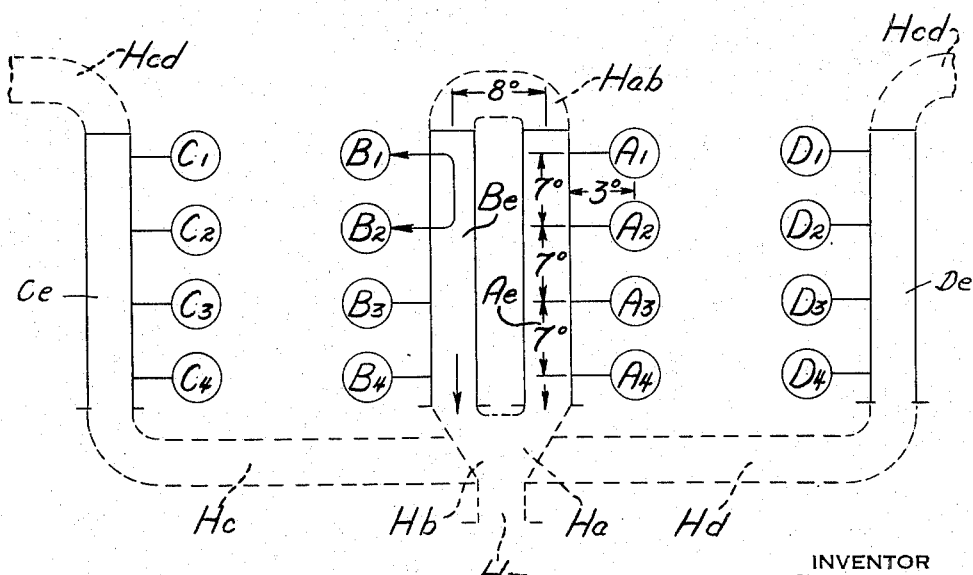

The runner-type exhaust and intake manifolding generally provided for such multi-row radial engines is diagrammatically shown by Figures 2 and 3. The runner-type exhaust manifolds for the A and B cylinders, A$e$ and B$e$, respectively, and the runner-type exhaust manifolds for the C and D cylinders, C$e$ and D$e$, respectively, are suitably attached to the exhaust passages of the cylinders of their respective inline groups and are disposed in parallel relation to each other in the space between their respective inline groupings. The intake manifolds B$i$ and C$i$ are similarly disposed between the B and C cylinder groupings, and the intake manifolds D$i$ and A$i$ are similarly disposed between the inline groupings D and A. As shown by broken lines in the diagrammatic development of Figure 3, such conventional runner-type exhaust manifolds A$e$, B$e$, C$e$ and D$e$ are generally connected at one end to a main exhaust discharge conduit H$m$ by branch conduits H$a$, H$b$, H$c$ and H$d$, and the manifolds A$e$, B$e$ and C$e$, D$e$ between adjacent inline cylinder rows may be connected together at their opposite ends by the conduits H$ab$ and H$cd$, respectively. As indicated above, the exhaust impulse pressure waves and the reactions therefrom in such runner-type exhaust manifold systems are generally detrimental to proper engine cylinder scavenging and result in poor engine operating characteristics.

In order to evaluate the phasing of these impulses in the exhaust manifolds, besides considering the phase angles of the operating cycles occurring between the various cylinders, it is desirable to take into account engine speed, the length of exhaust manifold piping between the cylinders, and the velocity of the pressure impulses. This will give a close approximation of the effective acoustical lengths of the segments or portions of the manifolding system measured as phase angles (degrees) of crankshaft rotation and thereby the actual phasing of the impulse reactions occurring at the exhaust port openings of each cylinder. Referring to Figure 3, if the length between the exhaust ports of cylinders B1 and B2 is taken by way of example to be five feet, then an exhaust impulse at B1 will be felt at B2 approximately 13° later than its effect at B1 if the engine normally operates at 600 R. P. M. and the speed of the gas impulse in the exhaust manifold is equal to the speed of sound in the exhaust gases or approximately 1400 feet per second. This is calculated by the following formula:

Phase angle of exhaust impulse reaction =

$$\frac{\text{R.P.M.} \times 360° \times \text{length of manifold (ft.)}}{60 \text{ secs.} \times \text{gas impulse velocity (F.P.S.)}}$$

By similar calculations, it might be determined that the phase angle between each of the cylinders and the manifold proper is 3°, the distance in each manifold runner between cylinders is 7°, and that the conduits H$ab$ and H$cd$ each amount to 8° of crankshaft rotation. The connection of the manifolds A$e$ and B$e$ through the conduits H$m$, H$a$ and H$b$ also amounts to 8°.

Referring now to the firing order of the various cylinders, as shown by the diagram of Figure 1a and based on the crank throw arrangement shown in Figure 1, it will be noted that the No. 3 cylinder of each bank fires 157½° after the No. 1 cylinder; the No. 2 cylinder fires 45° after the No. 3 cylinder; the No. 4 cylinder fires 112½° after the No. 2 cylinder; and the No. 1 cylinder fires 45° after the No. 4 cylinder. This firing pattern establishes the angular phase relationship between the operating cycles of the individual cylinders of each inline row. Taking into account the speed of the engine and the distance between the exhaust ports of the various cylinders, if the various runner exhaust manifolds A$e$, B$e$, C$e$ and D$e$ are not interconnected, the exhaust impulse reactions affecting the exhaust openings of other inline cylinders connected to the same runner are as follows: The No. 3 exhaust impulse reacts on the No. 1 exhaust opening at 157½° plus the 20° of manifold length therebetween or 177½°; the No. 2 exhaust impulse reacts on the No. 3 exhaust opening at 45° plus 13° or 58°; the No. 4 exhaust impulse reacts on the No. 2 exhaust port at 112½° plus 20° or 132½°; and the A1 exhaust impulse reacts on the A4 exhaust opening at 45° plus 27° or 72°.

Since the elapsed time of opening of the exhaust ports to the closing of the intake ports for a two-cycle engine is generally about 150° of crankshaft rotation with the intake ports opening 30° after the exhaust opening, as shown by the diagram of Figure 1a, it is seen that the scavenging and charging process on each No. 1 cylinder is not greatly affected by the exhaust impulse reaction from the No. 3 cylinder. However, the other three inline cylinders each have an impulse reaction from the exhaust impulse pressure wave initiated by the exhausting of one of the other cylinders requiring consideration; the No. 3 cylinder receives the exhaust impulse from the No. 2 cylinder at 58° or approximately 28° after the intake of the No. 3 cylinder has opened; the No. 2 cylinder receives the exhaust impulse reaction from the No. 4 cylinder at 132½° or 102½° after intake opening; and the No. 4 cylinder receives the impulse reaction from the No. 1 cylinder at 72° or 42° after its intake has opened. These exhaust impulse reactions and the different angular point at which they occur during the exhaust openings of the various cylinders is deterimental to good scavenging since they, in effect, act as a valve closing the exhaust ports and thereby prevent the proper scavenging and charging of the cylinder.

By connecting the manifold runners A$e$, B$e$, C$e$ and D$e$ to a common main discharge conduit H$m$ and interconnecting the adjacent exhaust manifolds by the conduits H$ab$ and H$cd$, as shown in Figure 3, the effective breathing capacity of the exhaust manifold system is somewhat increased. However, as shown in Table I below, such connections serve to compound the exhaust impulse reactions occurring at the various cylinder exhaust ports which are detrimental to the proper scavenging and charging of the affected cylinders.

Table I

| Affected cylinder | Exhaust impulse reaction from cylinder | Operating phase angle between cylinders | Manifolding phase angle per engine speed and manifolding length | | | | | Phase angle of affected cylinder at impulse reaction | Affected cylinder |
|---|---|---|---|---|---|---|---|---|---|
| | | | (1) | (2) | (3) | (4) | (5) | | |
| | | Degrees | Degrees | Degrees | Degrees | Degrees | Degrees | Degrees | |
| A1 | B4 | 45 | | | | | 35 | 80 | A1 |
| | B1 | 90 | | 14 | | | | 104, 140 | |
| | A3 | 157½ | 20 | | | 50 | | *177½, 207½ | |
| A2 | B3 | 45 | | | | | 35 | 80 | A2 |
| | B2 | 90 | | 28 | | 42 | | 118, 132 | |
| | A4 | 112½ | 20 | | | 50 | | *132½, 162½ | |
| A3 | A2 | 45 | 13 | | | 57 | | *58, 102 | A3 |
| A4 | A1 | 45 | 27 | | | 43 | | *72, 88 | A4 |
| | B4 | 90 | | 42 | 17 | | | 132, 107 | |
| B1 | A3 | 67½ | | 28 | 42 | | | 95½, 109½ | B1 |
| | A2 | 112½ | | 21 | 49 | | | 133½, 161½ | |
| | B3 | 157½ | 20 | | | 50 | | *177½, 207½ | |
| B2 | A4 | 22½ | | 42 | 28 | | | 64½, 50½ | B2 |
| | A1 | 67½ | | 21 | 49 | | | 88½, 116½ | |
| | B4 | 112½ | 20 | | | 50 | | *132½, 162½ | |
| B3 | B2 | 45 | 13 | | | 57 | | *58, 102 | B3 |
| | A4 | 67½ | | 49 | 21 | | | 116½, 68½ | |
| | A1 | 112½ | | 28 | 42 | | | 140½, 154½ | |
| B4 | B1 | 45 | 27 | | | 43 | | *72, 88 | B4 |

(1) Same runner manifold.
(2) Through connection Hab.
(3) Through connection Hm.
(4) Sequentially through Hm and Hab.
(5) Simultaneously through both Hm and Hab.
*Minimum impulse reactions from cylinders in same inline cylinder row.

This table shows the variation in number and timing of the exhaust impulse reactions acting in the exhaust runners Ae and Be at the exhaust ports of the various cylinders in the inline cylinder rows A and B. As explained before these variations are detrimental to the proper and even scavenging and charging of each cylinder and consequently result in uneven cylinder loadings and in rough operation of the engine generally. However, it will be noted that the foregoing table is limited to the exhaust impulsing of the inline cylinder rows A and B and of the exhaust runners Ae and Be. The exhaust runners Ce and De will also be subjected to similar exhaust impulses and the exhaust impulse reactions from the cylinders served by these two exhaust runners may have a further detrimental effect on the scavenging and charging process of the A and B inline cylinder groupings. However, these exhaust impulses will necessarily be dampened by their passage through the exhaust conduits Hc and Hd. It will also be appreciated that the exhaust impulse reactions from the A and B cylinders have a similar detrimental effect on the C and D cylinders. From Table I it is seen that the elimination of the interconnecting conduit Hab prevents the occurrence of the reactions listed under the main heading, "Manifolding Phase Angle," under columns 2 and 4. Similarly, the elimination of the common connection through conduit Hm prevents the occurrence of the reactions listed under columns 3 and 4 and the elimination of either interconnection will also prevent the reactions listed under column 5 from occurring simultaneously through the conduits Hab and Hm.

The invention contemplates the provision of an exhaust manifolding system for such a multi-row radial engine having a plurality of exhaust manifolds interconnecting a limited number of cylinders of adjacent inline cylinder rows in such a manner that the cylinders will discharge their exhaust gases at substantially equal intervals of engine rotation, the number of cylinders and the acoustical dimensions of each interconnecting manifold being such that each cylinder connected thereto will be subjected to a single exhaust impulse reaction during the gas exhausting portion of its operative cycle and occurring at approximately the same phase angle of the gas exhausting portion of its operating cycle as the single reactions occurring at the exhaust port openings of the other cylinders during the exhaust portions of their respective operating cycles. This will provide for more uniform gas flow within the respective exhaust manifolds, in more even scavenging and charging of the individual cylinders and consequently in more even loading thereof, and in smoother engine operation generally.

Figure 4:
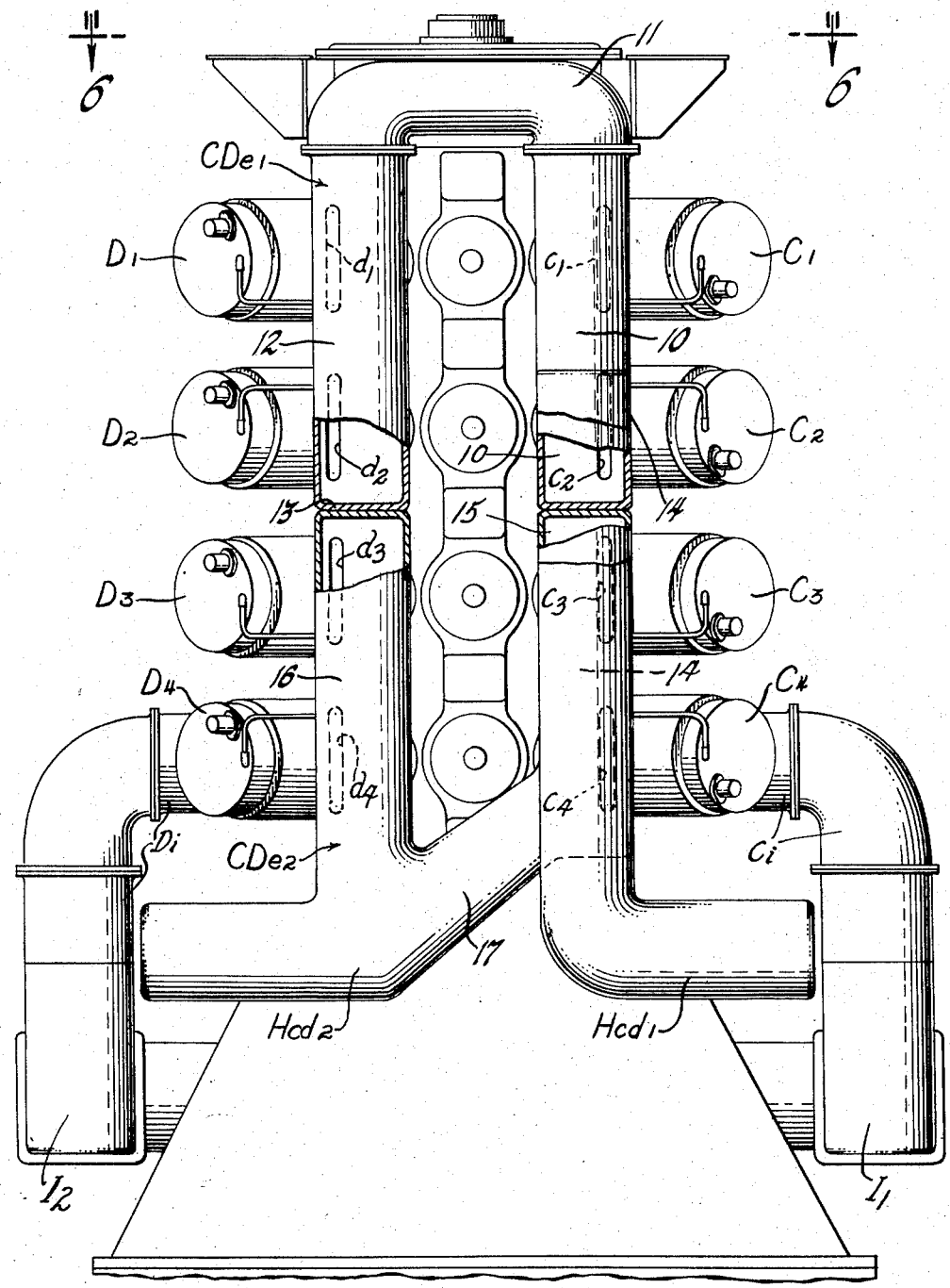
Figure 4 is a somewhat more detailed diagrammatic view of such an engine embodying one form of my invention taken in elevation along the line 4—4 of Figure 6.
Figure 5:
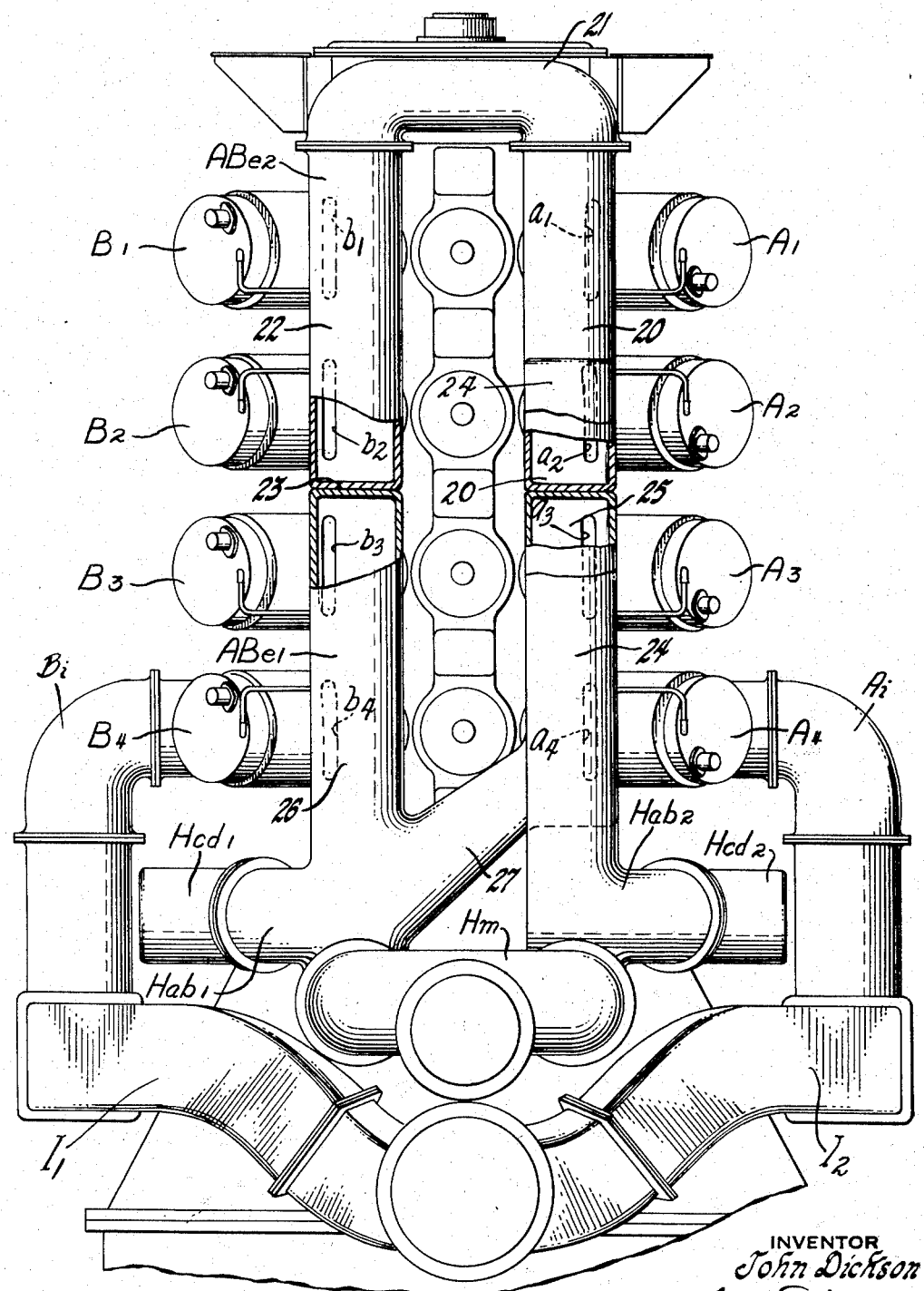
Figure 5 is a view similar to Figure 4 taken substantially on the line 5—5 of Figure 6.
Figure 6:
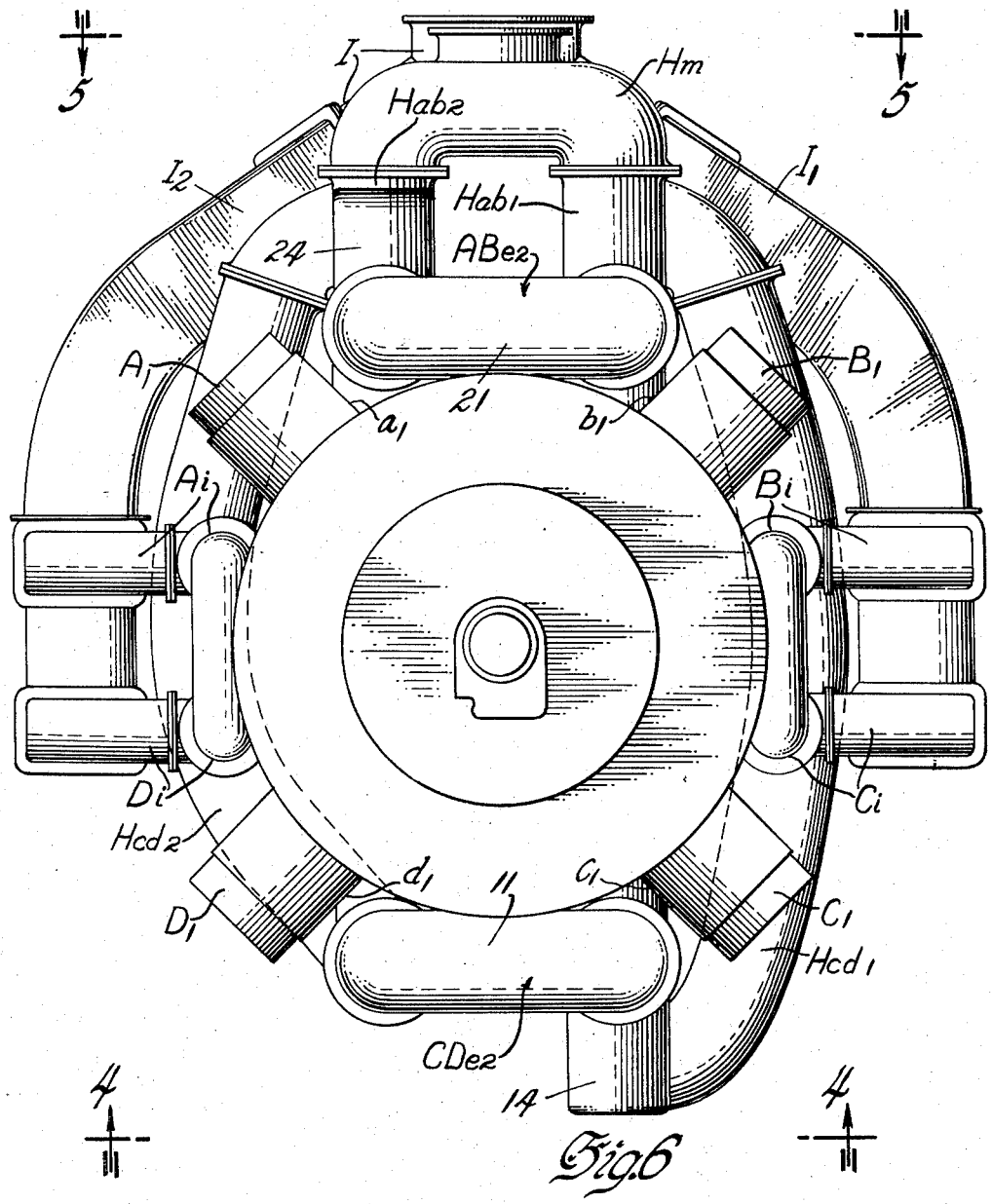
Figure 6 is a diagrammatic plan view taken in elevation substantially on the line 6—6 of Figure 4.

In the form of my invention shown in Figures 4 to 6, the exhaust ports d1, d2 and c1, c2 of cylinders C1, C2 and D1, D2, respectively, of a vertical crankshaft sixteen-cylinder X-type two-cycle engine are interconnected by a U-shaped manifold CDe1. The manifold CDe1 comprises two parallel leg portions 10 and 12 extending axially of the engine; the upper ends of which are inter-connected by a return bend portion 11 extending transversely of the engine. The lower end of the leg portion 12 is closed as indicated at 13. The lower end of the leg portion 10 is connected to an axially extending portion 14 of an exhaust discharge conduit Hcd1. The portion 14 is axially offset from the leg portion 10 to provide room for a leg portion 15 of a second U-shaped manifold CDe2. The leg portion 15 interconnects the exhaust ports c3 and c4 of the cylinders C3 and C4, respectively, while a second leg portion 16 interconnects the exhaust ports d3 and d4 of the cylinders D3 and D4, respectively, and is connected thereto by an obliquely extending portion 17. The manifold CDe2 is connected to an exhaust discharge conduit Hcd2. The discharge conduits Hcd1 and Hcd2 extend around the engine to the opposite side thereof and are connected to other discharge conduit members H$ab$1 and H$ab$2. The conduit member H$ab$2 has an axially extending portion 24, which is similar to the portion 14 of the H$cd$1 conduit and is axially offset from and connected to a U-shaped manifold AB$e$2 having portions 20, 21 and 22 corresponding to portions 10, 11 and 12, respectively, of the manifold CD$e$1. The leg portion 22 similar to the portion 12 is closed at one end as indicated at 23. The manifold section AB$e$2 serves the exhaust ports $a$1, $a$2, $b$1 and $b$2 of the cylinders A1, A2, B1 and B2, respectively. A second U-shaped manifold AB$e$1 having leg portions 25, 26 and 27 corresponding to the leg portions 15, 16 and 17 of the manifold CD$e$2 serves the exhaust ports $a$3, $a$4, $b$3 and $b$4 of the cylinders A3, A4, B3 and B4, respectively. The U-shaped manifold section AB$e$1 is connected to the discharge conduit member H$ab$1. The discharge conduit members H$ab$1 and H$ab$2 are shown interconnected to a main discharge conduit through the T fitting member H$m$.

As best shown in Figure 6, the intake manifolds B$i$, C$i$ and A$i$, D$i$ are connected to intake headers I1 and I2, respectively, which extend to one side of the engine where they are interconnected through a V-connection I to a source of pressurized intake air, not shown.

With the above-described exhaust manifolding arrangement, the principal exhaust impulse reactions are limited to one impulse reaction at each cylinder which occur at approximately the same phase angle of the exhaust portion of its operating cycle at which the various reactions occur at the other cylinders during the exhaust portions of their respective operating cycles. While the four manifold sections AB$e$1, AB$e$2, CD$e$1 and CD$e$2 are shown to be interconnected, the length of the discharge conduit members H$ab$2, H$cd$1, and H$cd$2 are of an effective acoustical length so that the impulse reactions from cylinders exhausting on the opposite side of the engine will occur subsequent to the port closing or will be of negligible strength in each particular manifold section. The phasing of the principal exhaust impulse reactions for this manifold arrangement is shown by Table II, below:

Table II

| Manifold | Affected cylinders connected by manifold | Exhaust impulse reaction from cylinder | Operating phase angle between cylinders, degrees | Manifolding phase angle between cylinders, degrees | Total phase angle at affected cylinder, degrees | Affected cylinder |
|---|---|---|---|---|---|---|
| AB$e$2 | A1 | B1 | 90 | 14 | 104 | A1. |
|  | A2 | B2 | 90 | 28 | 118 | A2. |
|  | B1 | A2 | 112½ | 21 | 133½ | B1. |
|  | B2 | A1 | 67½ | 21 | 88½ | B2. |
| AB$e$1 | A3 | B3 | 90 | 35½ | 125½ | A3. |
|  | A4 | B4 | 90 | 18½ | 108½ | A4. |
|  | B3 | A4 | 67½ | 25½ | 93 | B3. |
|  | B4 | A3 | 112½ | 25½ | 138 | B4. |
| CD$e$1 | C1 | D1 | 90 | 14 | 104 | C1. |
|  | C2 | D2 | 90 | 28 | 118 | C2. |
|  | D1 | C2 | 112½ | 21 | 133½ | D1. |
|  | D2 | C1 | 67½ | 21 | 88½ | D2. |
| CD$e$2 | C3 | D3 | 90 | 35½ | 125½ | C3. |
|  | C4 | D4 | 90 | 18½ | 108½ | C4. |
|  | D3 | C4 | 67½ | 25½ | 93 | D3. |
|  | D4 | C3 | 112½ | 25½ | 138 | D4. |

Mean phase angle of operating cycle @ affected cylinder=113½°.

By changes in the acoustical lengths of the manifolding between various cylinders as given in the discussion of Figure 3, the timing of the exhaust impulses occurring at the exhaust ports of the affected cylinder might be changed to give a greater or lesser phase angle with relation to the operating cycle thereof than that shown in the above table to thereby provide even more uniformity in the scavenging and charging of the various cylinders. A similar modification of the acoustical dimensions of this exhaust manifolding might also be used to provide impulse charging for such a two-cycle loop-scavenged engine; i. e., using the exhaust impulse reactions to effectively close the exhaust ports coincident with the closing of the inlet ports by the cylinder piston.

The above-described form of the invention utilizes manifolds AB$e$1, AB$e$2 and CD$e$1, CD$e$2 which are interchangeable, respectively, and retain the principal advantage of the runner-type exhaust manifolding system for such engines providing accessibility to the crankcase and other engine components. However, if such accessibility is not a necessary design factor, a better arrangement for constructing a sectional exhaust manifolding system in accordance with the invention is shown by Figure 7. In this form of the invention, the cylinders A1, A2, B1 and B2 are serviced by an exhaust manifold section AB$e$2′ and the exhaust ports of the cylinders A3, A4, B3 and B4 are serviced by an exhaust manifold section AB$e$1′. Similar exhaust manifolds for the C and D inline cylinder rows, not shown, are provided with discharge conduits H$cd$1′ and H$cd$2′ which are connected to the manifold sections AB$e$1′ and AB$e$2′ through the exhaust conduit members H$ab$1′ and H$ab$2′. The H$ab$1′, H$ab$2′, H$cd$1′ and H$cd$2′ conduit members correspond to the similar discharge conduit members in the form of the invention of Figures 4 to 6. The manifold section AB$e$2′ comprises two parallel portions 34 and 35 extending transversely of the engine and interconnecting the cylinders A1, B1 and A2, B2, respectively. A third portion 36 of this manifold section extends obliquely to interconnect the parallel portions 34 and 35 adjacent the cylinders B1 and A2, respectively. The length of the phase angle provided by the manifold portion 36 based on engine speed, length of manifolding and the speed of the exhaust impulse is 15½° between the cylinders B1 and A2. The manifold section AB$e$2′ is connected to the discharge conduit H$ab$2′ by an axially extending portion 37 thereof. The manifold section AB$e$1′ similarly comprises two parallel portions 44 and 45 which extend transversely of the engine to interconnect the cylinders A3, B3 and A4, B4 with an obliquely extending portion 46 serving to interconnect the two parallel portions 44 and 45 adjacent the cylinders A3 and B4, respectively. The manifold section AB$e$1′ is connetced to the exhaust conduit H$ab$1′ adjacent the cylinder A4 by an axially extending portion 47 of the conduit member. With this manifold arrangement, the exhaust impulse reactions in the various exhaust manifolds with respect to the phase angle of the operating cycle of the affected cylinder will be as shown in Table III, below:

Table III

| Manifold | Affected cylinders connected by manifold | Exhaust impulse reaction from cylinder | Operating phase angle between cylinders, degrees | Manifolding phase angle between cylinders, degrees | Total phase angle at affected cylinder, degrees | Affected cylinder |
|---|---|---|---|---|---|---|
| AB$e$2′ | A1 | B1 | 90 | 14 | 104 | A1. |
|  | A2 | B2 | 90 | 14 | 104 | A2. |
|  | B1 | A2 | 112½ | 15½ | 128 | B1. |
|  | B2 | A1 | 67½ | 43½ | 111 | B2. |
| AB$e$1′ | A3 | B3 | 90 | 14 | 104 | A3. |
|  | A4 | B4 | 90 | 14 | 104 | A4. |
|  | B3 | A4 | 67½ | 43½ | 111 | B3. |
|  | B4 | A3 | 112½ | 15½ | 128 | B4. |
| CD$e$1′ | C1 | D1 | 90 | 14 | 104 | C1. |
|  | C2 | D2 | 90 | 14 | 104 | C2. |
|  | D1 | C2 | 112½ | 15½ | 128 | D1. |
|  | D2 | C1 | 67½ | 43½ | 111 | D2. |
| CD$e$2′ | C3 | D3 | 90 | 14 | 104 | C3. |
|  | C4 | D4 | 90 | 14 | 104 | C4. |
|  | D3 | C4 | 67½ | 43½ | 111 | D3. |
|  | D4 | C3 | 112½ | 15½ | 128 | D4. |

Mean phase angle of operating cycle @ affected cylinder=112°.

The foregoing table shows that this second embodiment, while not permitting the degree of accessibility to the engine crankcase and other components achievable by the first embodiment, subjects the exhaust openings of each cylinder to a single exhaust impulse reaction with even less variation in the timing of the exhaust impulses with reference to the exhausting portions of the operating cycle of the affected cylinder. This results in still further improved scavenging and cylinder charging, smoother engine operation, and consequently improved engine output. It is appreciated that further changes in the dimensions in the manifold sections of this form of the invention may be made to achieve even more advantageous engine operation by changing the phase angle between the impulse reactions and the affected cylinders in the manner described above with reference to the first-described form of the invention.

While the foregoing description and drawings have been confined to several embodiments of the invention in multi-row loop-scavenged two-cycle radial engines for the purposes of illustration only, it will be apparent to those skilled in the art that the invention is adaptable to multi-row radial engines generally, and it will be further appreciated that various modifications may be made therein without departing from the spirit and scope of the invention as defined in the following claims.

I claim:

1. An exhaust manifold system for a 16-cylinder X-type two-cycle engine, said engine having four inline banks, A, B, C and D of four cylinders each, a crankshaft journaled in said engine having a crank throw for each of said cylinder banks and said crank throws being so arranged on said crankshaft to give even firing of all cylinders throughout 360° of crankshaft rotation in the order A1, C2, B4, D3, B1, D2, C4, A3, C1, A2, D4, B3, D1, B2, A4 and C3, and each of said cylinders having exhaust means associated therewith for sequentially exhausting combustion gases therefrom in phased relation to its firing order, said exhaust manifold system comprising a plurality of exhaust manifolds AB$e$2, AB$e$1, CD$e$1 and CD$e$2, each of said manifolds being connectable to atmosphere and interconnecting the exhaust means of pairs of inline cylinders on adjacent inline banks, viz. A1, A2, B1 and B2; A3, A4, B3 and B4; C1, C2, D1 and D2; and C3, C4, D3 and D4, respectively, the sequential exhausting of the combustion gases for the several cylinders interconnected by each of said manifolds tending to set up exhaust impulse pressure waves in the manifold connected thereto and each of said manifolds being of such acoustical dimension intermediate the cylinders connected thereto that the exhaust means of each cylinder connected thereto will be subjected to a single exhaust impulse reaction during the gas exhausting portion of its operating cycle, said single reaction occurring at said last-mentioned exhaust means at substantially the same phase of its operating cycle as the exhaust impulse reactions occurring at the exhausting means of each of the other cylinders of the engine during the gas exhausting portions of their respective operating cycles, and means for connecting said manifolds to atmosphere including a first exhaust header interconnecting the manifolds AB$e$1 and CD$e$1, a second exhaust header interconnecting the manifolds AB$e$2 and CD$e$2, and a third header interconnecting said first and second headers, said third header being connected at one end to said first header adjacent its connection to the manifold AB$e$1 and being connected at its opposite end to said second header intermediate its connections to the manifolds AB$e$2 and CD$e$2, and said third header being connectable to atmosphere intermediate its ends.

2. An exhaust manifold system for a 16-cylinder X-type two-cycle engine, said engine having four inline banks A, B, C and D of four cylinders each, a crankshaft journaled in said engine having a crank throw for each of said cylinder banks and said crank throws being so arranged on said crankshaft to give even firing of all cylinders throughout 360° of crankshaft rotation in the order A1, C2, B4, D3, B1, D2, C4, A3, C1, A2, D4, B3, D1, B2, A4 and C3, and each of said cylinders having exhaust means associated therewith for sequentially exhausting combustion gases therefrom in phased relation to its firing order, said exhaust manifold system comprising a plurality of exhaust manifolds AB$e$2, AB$e$1, CD$e$1 and CD$e$2, each of said manifolds including two spaced parallel portions disposed axially of said engine between adjacent inline cylinder banks and a third portion extending transversely of said engine and interconnecting said first two portions, said parallel portions of each manifold interconnecting the exhaust means of pairs of inline cylinders, viz. A1—A2 and B1—B2; A3—A4 and B3—B4; C1—C2 and D1—D2; and C3—C4 and D3—D4, respectively, the sequential exhausting of the combustion gases from the several cylinders interconnected by each of said manifolds tending to set up exhaust impulse pressure waves in the manifold connected thereto and said portions of each of said manifolds being of such acoustical dimension intermediate the cylinders connected thereto that the exhaust means of each cylinder connected thereto will be subjected to a single exhaust impulse reaction during the gas exhausting portion of its operating cycle, said single reaction occurring at each exhaust means at substantially the same phase of its operating cycle as the exhaust impulse reactions occurring at the exhausting means of each of the other cylinders of the engine during the gas exhausting portions of their respective operating cycles, and means for connecting said manifolds to atmosphere including a first exhaust header interconnecting the manifolds AB$e$1 and CD$e$1, a second exhaust header interconnecting the manifolds AB$e$2 and CD$e$2, and a third header interconnecting said first and second headers, said third header being connected at one end to said first header adjacent its connection to the manifold AB$e$1 and being connected at its opposite end to said second header intermediate its connections to the manifolds AB$e$2 and CD$e$2, and said third header being connectable to atmosphere intermediate its ends.

3. An exhaust manifold system for a 16-cylinder X-type two-cycle engine, said engine having four inline banks A, B, C and D of four cylinders each, a crankshaft journaled in said engine having a crank throw for each of said cylinder banks and said crank throws being so arranged on said crankshaft to give even firing of all cylinders throughout 360° of crankshaft rotation in the order A1, C2, B4, D3, B1, D2, C4, A3, C1, A2, D4, B3, D1, B2, A4 and C3, and each of said cylinders having exhaust means associated therewith for sequentially exhausting combustion gases therefrom in phased relation to its firing order, said exhaust manifold system comprising a plurality of exhaust manifolds AB$e$2, AB$e$1, CD$e$1 and CD$e$2, each of said manifolds including two spaced parallel portions extending transversely of said engine between adjacent inline cylinder banks and a third portion extending transversely of said engine and interconnecting said first two portions, said parallel portions of each manifold interconnecting the exhaust means of pairs of inline cylinders, vis. A1—B1 and A2—B2; A3—B3 and A4—B4; C1—D1 and C2—D2; and C3—D3 and C4—D4, respectively, the sequential exhausting of the combustion gases from the several cylinders interconnected by each of said manifolds tending to set up exhaust impulse pressure waves in the manifold connected thereto and said portions of each of said manifolds being of such acoustical dimension intermediate the cylinders connected thereto that the exhaust means of each cylinder connected thereto will be subjected to a single exhaust impulse reaction during the gas exhausting portion of its operating cycle, said single reaction occurring at each exhaust means at substantially the same phase of its operating cycle as the exhaust impulse reactions occurring at the exhausting means of each of the other cylinders of the engine during the gas exhausting portions of their respective operating cycles, and means for connecting said manifolds to atmosphere including a first exhaust header interconnecting the manifolds AB$e$1 and CD$e$1, a second exhaust header interconnecting the manifolds AB$e$2 and CD$e$2, and a third header interconnecting said first and second headers, said third header being connected at one end to said first header adjacent its connection to the manifold ABe1 and being connected at its opposite end to said second header intermediate its connections to the manifolds ABe2 and CDe2, and said third header being connectable to atmosphere intermediate its ends.

References Cited in the file of this patent

UNITED STATES PATENTS

| | | | |
|---|---|---|---|
| 2,305,295 | Lang et al. | Dec. 15, | 1942 |
| 2,306,580 | Wilson | Dec. 29, | 1942 |
| 2,375,091 | Eiss et al. | May 1, | 1945 |
| 2,685,166 | Hasbrouck et al. | Aug. 3, | 1954 |